US011012972B2

(12) United States Patent
Hong et al.

(10) Patent No.: US 11,012,972 B2
(45) Date of Patent: May 18, 2021

(54) METHOD FOR RELAYING PAGING AND RELAY USER EQUIPMENT, AND PAGING RECEPTION METHOD AND REMOTE USER EQUIPMENT

(71) Applicant: LG Electronics Inc., Seoul (KR)

(72) Inventors: Jongwoo Hong, Seoul (KR); Jaewook Lee, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/486,365

(22) PCT Filed: Feb. 14, 2018

(86) PCT No.: PCT/KR2018/001943
§ 371 (c)(1),
(2) Date: Aug. 15, 2019

(87) PCT Pub. No.: WO2018/151534
PCT Pub. Date: Aug. 23, 2018

(65) Prior Publication Data
US 2019/0373578 A1 Dec. 5, 2019

Related U.S. Application Data

(60) Provisional application No. 62/459,500, filed on Feb. 15, 2017.

(51) Int. Cl.
*H04W 68/00* (2009.01)
*H04W 76/28* (2018.01)
(Continued)

(52) U.S. Cl.
CPC ......... *H04W 68/005* (2013.01); *H04W 76/27* (2018.02); *H04W 76/28* (2018.02); *H04W 88/04* (2013.01)

(58) Field of Classification Search
CPC ............................ H04W 68/005; H04W 88/04
See application file for complete search history.

(56) References Cited

U.S. PATENT DOCUMENTS 9,363,095 B2 * 6/2016 Kim ...................... H04L 12/189
10,448,360 B2 * 10/2019 Tenny ................. H04W 68/005
(Continued)

FOREIGN PATENT DOCUMENTS

KR  1020090035799     4/2009
KR  1020100127814    12/2010
(Continued)

OTHER PUBLICATIONS

PCT International Search Report and Written Opinion in International Application No. PCT/KR2018/001943, dated May 17, 2018, 20 pages. (with English translation).

*Primary Examiner* — Parth Patel
(74) *Attorney, Agent, or Firm* — Fish & Richardson P.C.

(57) ABSTRACT

A relay user equipment (UE) linked to a remote UE relays paging to the remote UE. The relay UE transmits paging frame (PF) information and paging occasion (PO) information to the remote UE. The relay UE receives a paging message for the remote UE in a PO of the remote UE or in a PO of the relay UE within a PF of the relay UE on the basis of the PF information and the PO information. The relay UE relays the paging message to the remote UE.

12 Claims, 11 Drawing Sheets

(51) Int. Cl.
*H04W 76/27* (2018.01)
*H04W 88/04* (2009.01)

(56) References Cited

U.S. PATENT DOCUMENTS

| | | | | |
|---|---|---|---|---|
| 10,499,367 | B2* | 12/2019 | Shim | H04W 68/025 |
| 10,652,325 | B2* | 5/2020 | Yang | H04W 74/002 |
| 10,743,286 | B2* | 8/2020 | Li | H04W 88/04 |
| 2009/0219844 | A1* | 9/2009 | Soliman | H04W 88/04 |
| | | | | 370/311 |
| 2010/0261480 | A1* | 10/2010 | Cho | H04B 7/2606 |
| | | | | 455/445 |
| 2012/0220214 | A1* | 8/2012 | Du | H04W 68/005 |
| | | | | 455/7 |
| 2013/0016646 | A1* | 1/2013 | Chang | H04W 76/14 |
| | | | | 370/312 |
| 2014/0092801 | A1* | 4/2014 | Kim | H04W 68/02 |
| | | | | 370/312 |
| 2014/0169259 | A1* | 6/2014 | Lee | H04W 4/06 |
| | | | | 370/312 |
| 2017/0086166 | A1* | 3/2017 | Kasilya Sudarsan | |
| | | | | H04W 68/12 |
| 2017/0142686 | A1* | 5/2017 | Zhang | H04L 67/303 |
| 2017/0325193 | A1* | 11/2017 | Xiong | H04W 52/0245 |
| 2018/0069618 | A1* | 3/2018 | Loehr | H04W 72/1263 |
| 2018/0199303 | A1* | 7/2018 | Vayilapelli | H04L 67/12 |
| 2018/0302878 | A1* | 10/2018 | Byun | H04W 68/02 |
| 2019/0123814 | A1* | 4/2019 | Martin | H04B 7/2606 |
| 2019/0159018 | A1* | 5/2019 | Basu Mallick | H04W 4/023 |
| 2019/0215799 | A1* | 7/2019 | Talebi Fard | H04W 68/005 |
| 2019/0223147 | A1* | 7/2019 | Chen | H04W 68/005 |
| 2019/0261309 | A1* | 8/2019 | Martin | H04W 76/11 |
| 2019/0327710 | A1* | 10/2019 | Liu | H04W 68/02 |
| 2019/0335418 | A1* | 10/2019 | Stojanovski | H04W 68/005 |
| 2019/0357171 | A1* | 11/2019 | Miao | H04B 7/26 |
| 2019/0364492 | A1* | 11/2019 | Azizi | H04W 4/029 |
| 2019/0373578 | A1* | 12/2019 | Hong | H04W 68/02 |
| 2019/0373647 | A1* | 12/2019 | Rugeland | H04W 76/10 |
| 2019/0387498 | A1* | 12/2019 | Li | H04W 88/04 |
| 2020/0068380 | A1* | 2/2020 | Wallentin | H04W 68/005 |

FOREIGN PATENT DOCUMENTS

| | | |
|---|---|---|
| KR | 1020130008482 | 1/2013 |
| WO | 2016032201 | 3/2016 |
| WO | 2016019528 | 11/2016 |

* cited by examiner (a) Control-Plane Protocol Stack (b) User-Plane Protocol Stack

METHOD FOR RELAYING PAGING AND RELAY USER EQUIPMENT, AND PAGING RECEPTION METHOD AND REMOTE USER EQUIPMENT

CROSS-REFERENCE TO RELATED APPLICATIONS

This application is a National Stage application under 35 U.S.C. § 371 of International Application No. PCT/KR2018/001943, filed on Feb. 14, 2018, which claims the benefit of U.S. Provisional Application No. 62/459,500, filed on Feb. 15, 2017. The disclosures of the prior applications are incorporated by reference in their entirety.

TECHNICAL FIELD

The present invention relates to a wireless communication system. Particularly, the present invention relates to a method of transmitting/receiving paging and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

In addition, when one UE performs access through another UE serving as a relay, a new method for efficient communication between the two UEs is needed.

The technical objects that can be achieved through the present invention are not limited to what has been particularly described hereinabove and other technical objects not described herein will be more clearly understood by persons skilled in the art from the following detailed description.

Technical Solution

According to an aspect of the present invention, provided herein is method of relaying paging by a relay user equipment (UE) linked to a remote UE in a wireless communication system. The method includes: transmitting paging frame (PF) information and paging occasion (PO) information to the remote UE; receiving a paging message for the remote UE in a PO of the relay UE or a PO of the remote UE within a PF of the relay UE based on the PF information and the PO information; and relaying the paging message to the remote UE.

According to another aspect of the present invention, provided herein is a relay user equipment (UE) for relaying paging to a remote UE linked to the relay UE in a wireless communication system. The relay UE includes a radio frequency (RF) unit, and a processor configured to control the RF unit. The processor is configured to: control the RF unit to transmit paging frame (PF) information and paging occasion (PO) information to the remote UE; control the RF unit to receive a paging message for the remote UE in a PO of the relay UE or a PO of the remote UE within a PF of the relay UE based on the PF information and the PO information; and control the RF unit to relay the paging message to the remote UE.

According to another aspect of the present invention, provided herein is a method of receiving paging by a remote user equipment (UE) linked to a relay UE in a wireless communication system. The method includes: receiving paging frame (PF) information and paging occasion (PO) information from the remote UE; and receiving a paging message for the remote UE from the relay UE based on the PF information and the PO information.

According to another aspect of the present invention, provided herein is a remote user equipment (UE) for receiving paging from a relay UE linked to the remote UE in a wireless communication system. The relay UE includes a radio frequency (RF) unit, and a processor configured to control the RF unit. The processor is configured to: control the RF unit to receive paging frame (PF) information and paging occasion (PO) information from the remote UE; and control the RF unit to receive a paging message for the remote UE from the relay UE based on the PF information and the PO information.

In each aspect of the present invention, the paging message may be relayed to the remote UE within the PF of the relay UE.

In each aspect of the present invention, the paging message may be relayed to the remote UE in a PO in which the paging message is received.

In each aspect of the present invention, the relay UE may transmit information indicating the PF of the relay UE and the PO of the relay UE, calculated based on a UE identity of the relay UE, to a network. The relay UE may receive configuration information indicating one or more POs from the network. The PO information may include information indicating the one or more POs. The one or more POs may belong to the PF of the relay UE.

In each aspect of the present invention, the PF information may include information indicating the PF of the relay UE.

In each aspect of the present invention, the relay UE may be in an RRC_IDLE state and may have PC5 connection with the remote UE. The paging message may be relayed to the remote UE by the relay UE through the PC5 connection.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

In addition, when one UE performs access through another UE serving as a relay, communication between the two UEs may be efficiently performed.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
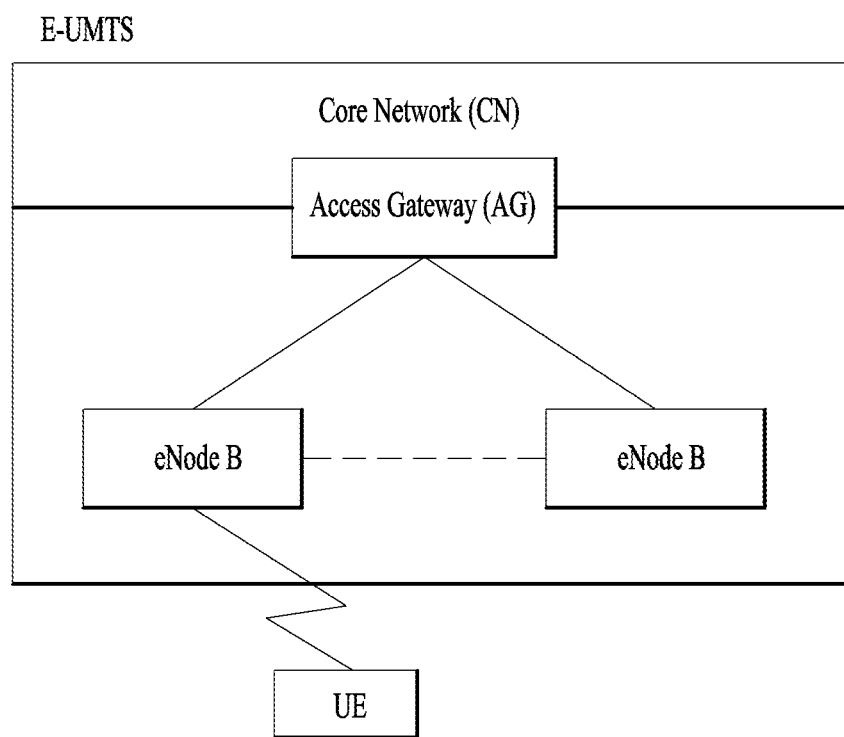
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. Especially, a BS of the UMTS is referred to as a NB, a BS of the EPC/LTE is referred to as an eNB, and a BS of the new radio (NR) system is referred to as a gNB. For convenience of description, in describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

For terms and techniques that are not described in detail among terms and techniques used in the present invention, reference may be made to standard specifications of 3GPP LTE/LTE-A, for example, 3GPP TS 36.211, 3GPP TS 36.212, 3GPP TS 36.213, 3GPP TS 36.300, 3GPP TS 36.304, 3GPP TR 36.746, 3GPP TS 36.321, 3GPP TS 36.322, 3GPP TS 36.323, and 3GPP TS 36.331.

Figure 2:
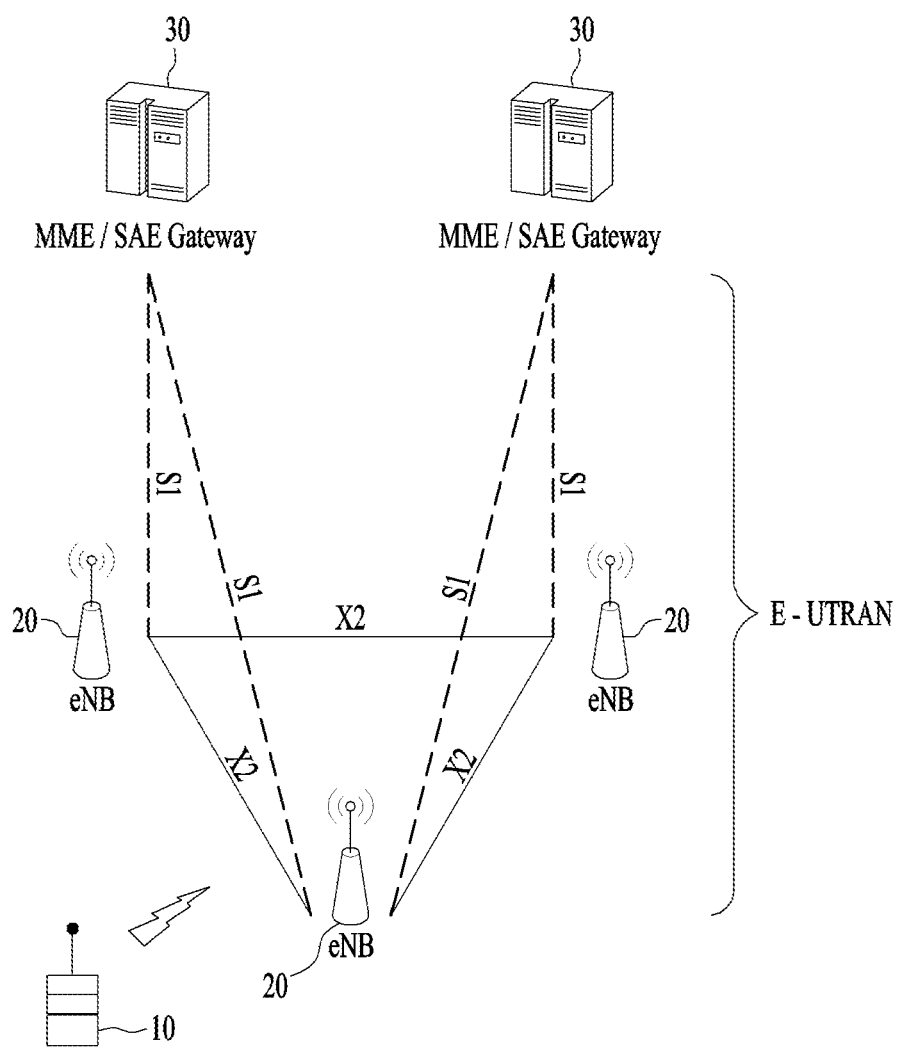
FIG. 2 is a block diagram illustrating a structure of an evolved-universal terrestrial radio access network (E-UTRAN).

FIG. 2 is a block diagram illustrating a structure of an evolved-universal terrestrial radio access network (E-UTRAN). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNb 20 to UE 10, and "uplink" refers to communication from the UE to an eNB.

Figure 3:
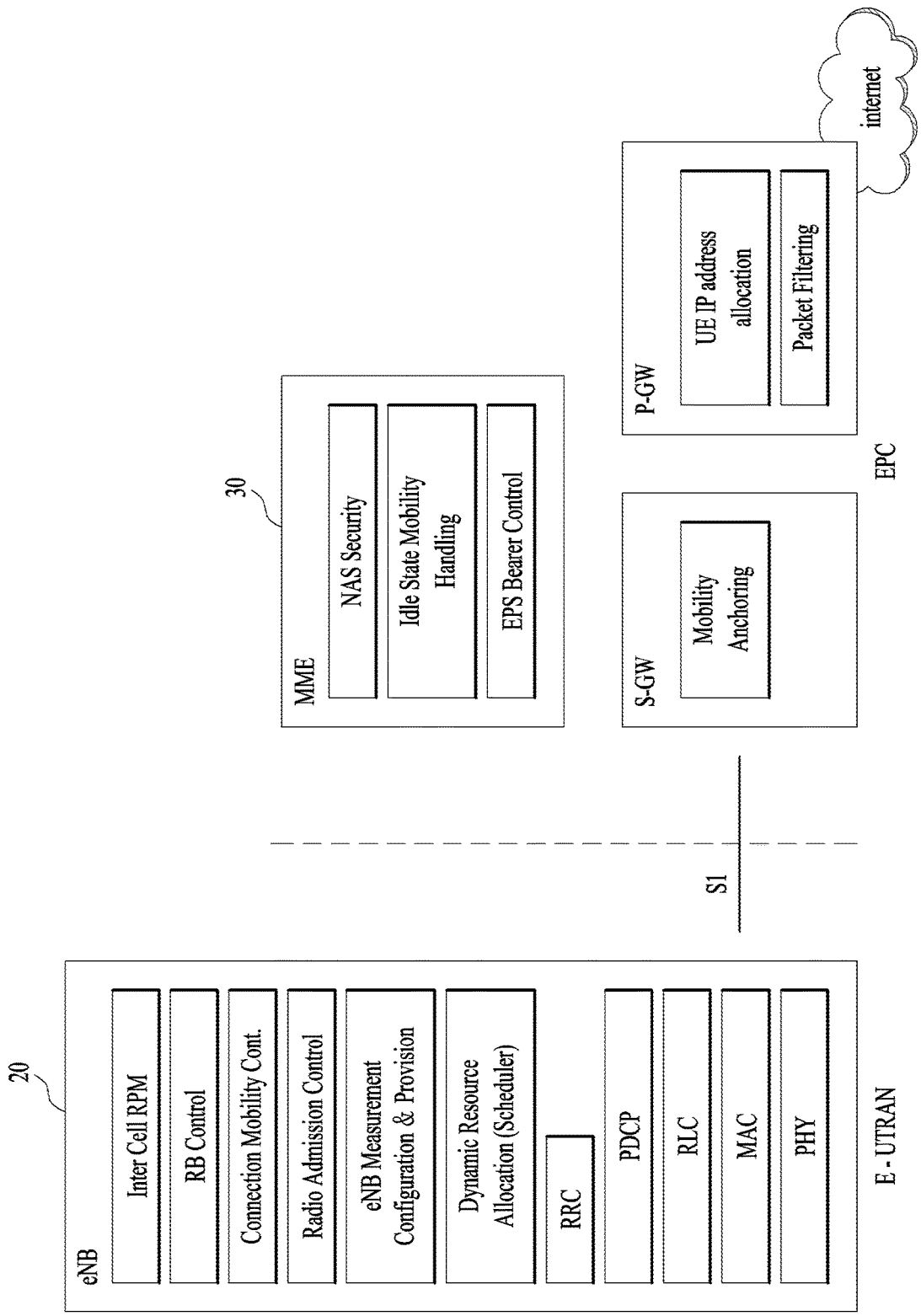
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNb 20 provides end points of a user plane and a control plane to the UE 10. MME/SAE gateway eNb 30 provides an end point of a session and mobility management function for UE 10. The eNB and MME/SAE gateway may be connected via an S1 interface.

The eNb 20 is generally a fixed station that communicates with a UE 10, and may also be referred to as a base station (BS) or an access point. One eNb 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. K packet inspection), Lawful Interception, UE IP address allocation, Transport level packet marking in the downlink, UL and DL service level charging, gating and rate enforcement, DL rate enforcement based on APN-AMBR. For clarity MME/SAE gateway eNb 30 will be referred to herein simply as a "gateway," but it is understood that this entity includes both an MME and an SAE gateway.

A plurality of nodes may be connected between eNb 20 and gateway eNb 30 via the S1 interface. The eNBs 20 may be connected to each other via an X2 interface and neighboring eNBs may have a meshed network structure that has the X2 interface.

As illustrated, eNb 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE ACTIVE state. In the EPC, and as noted above, gateway eNb 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
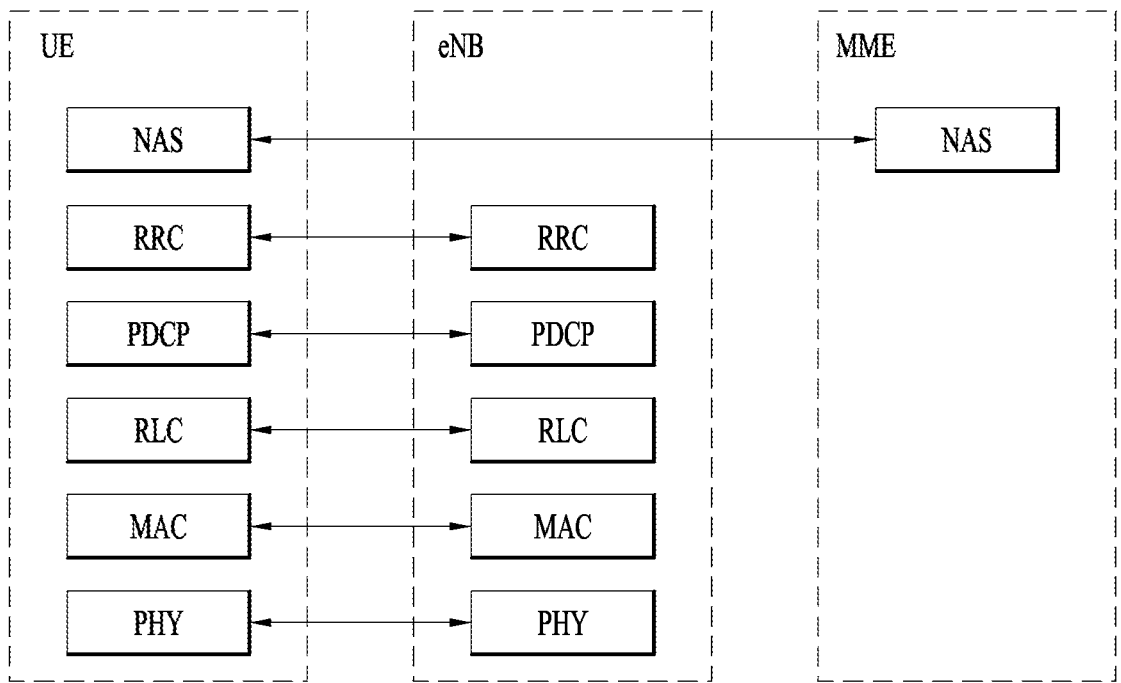
FIG. 4 is a diagram showing a control plane (CP) and a user plane (UP) of a radio interface protocol between a UE and an E-UTRAN based on a 3GPP radio access network standard.
Figure 4:
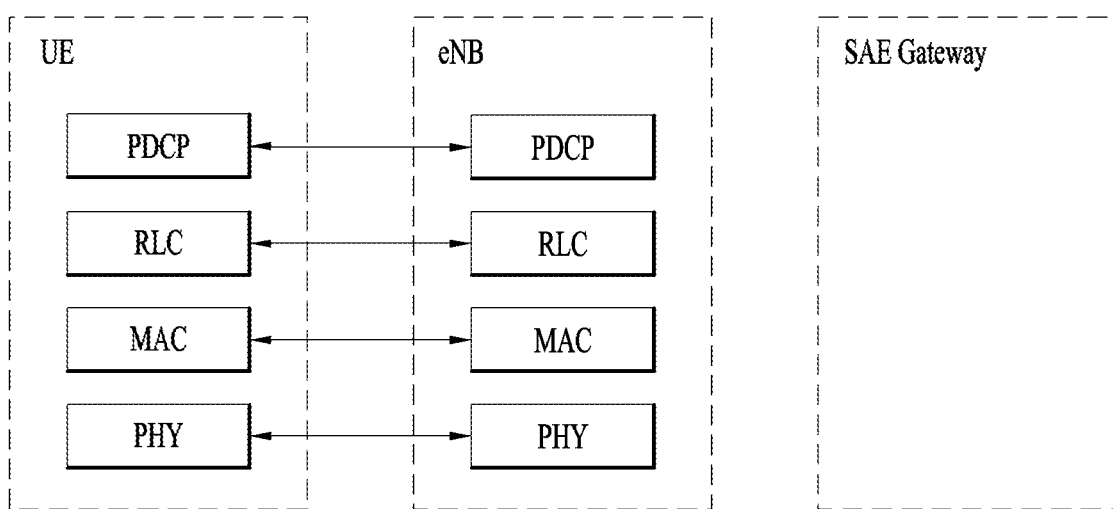

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer which is a first layer (i.e., L1 layer) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer (i.e., L2 layer) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer (i.e. L3 layer) is defined only in the control plane. The RRC layer controls logical channels, transport channels, and physical channels in relation to configuration, re-configuration, and release of radio bearers (RBs). An RB refers to a service that the second layer provides for data transmission between the UE and the network. To this end, the RRC layer of the UE and the RRC layer of the network exchange RRC messages with each other.

In the present invention, an RRC connection state refers to a state indicating whether the RRC layer of the UE has been logically connected with the RRC layer of the E-UTRAN. A state having logical connection between the RRC layer of the UE and the RRC layer of the E-UTRAN is referred to as "UE is in RRC_CONNECTED" and a state having no logical connection therebetween is referred to as "UE is in RRC_IDLE". In other words, if RRC connection is established between the RRC layer of the UE and the RRC layer of the radio network, the UE is in RRC_CONNECTED (i.e., RRC_CONNECTED mode) and, if not, the UE is in RRC_IDLE (i.e., RRC_IDLE mode). Since a UE of an RRC_CONNECTED state has RRC connection, the E-UTRAN may recognize the presence of the UE in a cell unit, thereby effectively controlling the UE. For a UE in RRC_IDLE, the E-UTRAN may not recognize presence of the UE and a core network manages the UE in a tracking area (TA) unit which is an area unit larger than a cell. That is, for the UE in RRC_IDLE, only the presence or absence thereof is recognized in a large area unit relative to the cell and, in order to be provided with a usual mobile communication service such as a voice or data service, the UE should transition to an RRC_CONNECTED state. A TA is distinguished from another TA by a tracking area identity (TAI). A UE may configure the TAI through a tracking area code (TAC), which is information broadcast from the cell. When a user initially turns on the UE, the UE searches for a proper cell first. Then, the UE establishes RRC connection in the cell and registers information thereabout in the core network. Next, the UE stays in RRC_IDLE. When necessary, the UE staying in RRC_IDLE (re)selects a cell and checks system information or paging information. This operation is called camping on a cell. Only when the UE staying in RRC_IDLE needs to establish RRC connection, does the UE establish RRC connection with the RRC layer of the E-UTRAN through an RRC connection procedure and transition to an RRC_CONNECTED state. The UE staying in RRC_IDLE needs to establish RRC connection in many cases. For example, the cases may include an attempt of a user to make a phone call, an attempt to transmit data, or transmission of a response message after reception of a paging message from the E-UTRAN.

Radio bearers are roughly classified into (user) data radio bearers (DRBs) and signaling radio bearers (SRBs). SRBs are defined as radio bearers (RBs) that are used only for the transmission of RRC and NAS messages.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the network include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
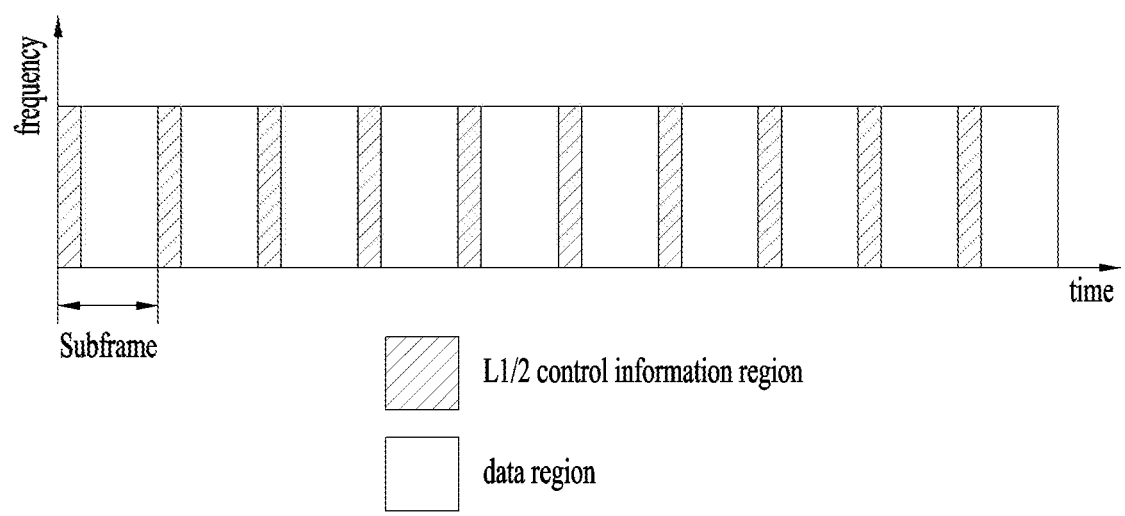
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The PDCCH carries scheduling assignments and other control information. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, an opportunity of transmission of an UL grant or a DL grant is present every 1 ms, and the UL/DL grant opportunity does not exists several times in less than 1 ms. Therefore, the TTI in the legacy LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Proximity service (ProSe) communication has been introduced into a wireless communication network for minimization of power consumption of UEs, communication support for UEs located out of network coverage, and emergency communication, based on 3GPP. ProSe refers to a service that allows physically close devices to discover themselves and communicate via direct links, via an eNB, or via a third device. In this case, user plane data is exchanged between UEs through a direct data path without passing through a 3GPP core network (e.g., EPC). In a legacy wireless communication system, two UEs generally communicate with each other via the eNB and the core network (e.g., EPC) that are operated by an operator. In contrast, ProSe communication supports direct communication between two UEs without passing through the eNB and the core network (e.g., EPC) that are operated by an operator. Recently, ProSe communication has considered introduction of relaying, for improvement in network coverage to raise performance and connection to non-3GPP communication (e.g., Wi-Fi, Bluetooth, etc.). Herein, ProSe communication may include ProSe UE-to-network relaying.

Figure 6:
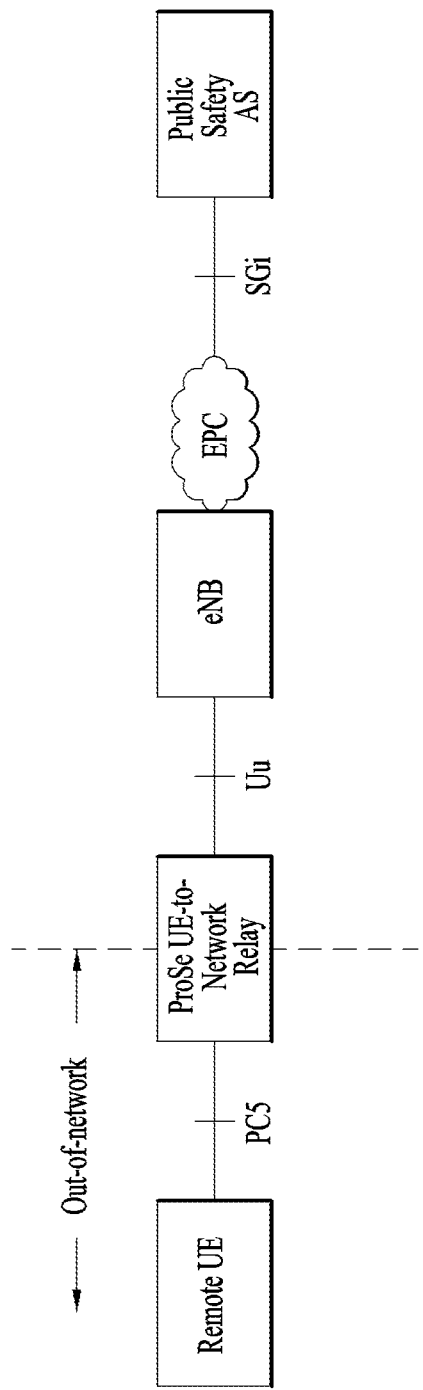
FIG. 6 illustrates communication through ProSe UE-to-network relaying.

FIG. 6 illustrates communication through ProSe UE-to-network relaying.

A remote UE is provided with connectivity to an EPC by a UE-to-network relay UE so that the remote UE may communicate with an application server (AS) or participate in group communication. Then, a UE located out of network coverage (e.g., a UE that is not served by an E-UTRAN) may receive a connection service to a network through the ProSe UE-to-network relay UE. In addition, even a UE located within network coverage may perform, through ProSe UE-to-network relaying, communication using only power of a degree capable of reaching a near relay rather than an eNB distant from the UE, thereby saving battery. A UE that is operable as the ProSe UE-to-network relay UE may access a network to provide relay traffic to the remote UE. In the present invention, the remote UE refers to a UE that is not served by wireless communication networks (e.g., an E-UTRAN, NextGen, etc.) and is connected to the network through UE-to-network relaying. The ProSe UE-to-network relay UE (hereinafter, relay UE) refers to a UE that transfers, between the network using wireless communication technologies (e.g., E-UTRAN, new RAT (i.e., NR), etc.) and the remote UE, information/data that should be transmitted/received between the remote UE and the network. In a radio interface, ProSe communication is implemented through sidelink communication. In the present invention, ProSe communication may be implemented using an LTE-based PC5 interface. The PC5 interface is a reference point between ProSe-enabled UEs used for control and user planes, for ProSe direct discovery, ProSe direct communication, and ProSe UE-to-network relaying (see 3GPP TS 23.303). Lower protocol layers of the PC5 reference point may be based on E-UTRA sidelink capabilities or WLAN technology, specified in 3GPP TS 36.300. The PC5 interface may be used between the remote UE and the relay UE and a Uu interface, which is also used for normal UE-to-network communication, may be used between the relay UE and a network node (e.g., eNB). If discovery and discovery announcement are made between UEs through PC5-S, which is a higher layer than a radio resource control (RRC) layer, the UEs are linked. PC5-S means a PC5 signaling protocol. The PC5-S protocol is used for control plane signaling over PC5 (e.g., establishment, maintenance, and release of a secure layer-2 link over PC5, temporary mobile group identity (TMGI) monitoring requests, cell ID announcement requests, etc.) (see 3GPP TS 23.303). If PC5 connection is established between the UEs so that the UEs are linked, radio resource configuration for sidelink communication between the UEs is performed based on RRC signaling. The UEs perform sidelink transmission/reception (e.g., transmission/reception of sidelink control information and related data) using resources in the radio resource configuration in a physical layer.

Technology for a sidelink relaying operation includes UE-to-network relaying through 3GPP or non-3GPP access (using, for example, Wi-Fi/Bluetooth). Sidelink refers to a link between a remote UE and a relay UE. The remote UE may be connected to the network via the relay UE. It is expected that, for example, wearable, machine type communication (MTC), and Internet of things (IoT) devices will be mainly used as the remote UE.

In a 3GPP based communication system, discontinuous reception (DRX) is used for power saving of the UE and efficient resource use. Hereinafter, DRX in an IDLE mode will be described with reference to 3GPP TS 36.304. The UE may use DRX in the IDLE mode in order to reduce power consumption. UEs in the IDLE mode monitor a PDCCH for a paging radio network temporary identifier (P-RNTI) used for paging (hereinafter, a P-RNTI PDCCH) to receive a paging message from an eNB. The UEs need to monitor the P-RNTI PDCCH only in a UE-specific paging occasion, i.e., in a specific subframe in a specific radio frame. One paging occasion (PO) is a subframe in which there may be a P-RNTI transmitted on a PDCCH, an MTC PDCCH (MPDCCH), or, for narrowband IoT (NB-IoT), on a narrowband PDCCH (NPDCCH), that addresses a paging message. For the P-RNTI transmitted on the MPDCCH, PO refers to the starting subframe of MPDCCH repetitions. For the P-RNTI transmitted on the NPDCCH, PO refers to the starting subframe of NPDCCH repetitions unless a subframe determined by PO is not a valid NB-IoT DL subframe. If the subframe determined by PO is an invalid NB-IoT DL subframe, the first valid NB-IoT DL subframe after PO is the starting subframe of the NPDCCH repetitions. One paging frame (PF) is one radio frame which may include one or multiple POs. When DRX is used, the UE needs only to monitor one PO per DRX cycle. One paging narrowband (PNB) is one narrowband on which the UE performs paging message reception. PF, PO, and PNB are determined by the following equations using DRX parameters provided in system information. For example, an information element (IE) RadioResourceConfigCommonSIB used to specify common radio resource configuration in system information (e.g., system information block type 2 (SIB2)) may include configuration information regarding a paging channel (PCCH) and the configuration information regarding the PCCH may include a paging cycle used to derive a DRX cycle T of the UE.

PF is given by following equation: SFN mod T=(T div N)*(UE_ID mod N). Index i_s pointing to PO from subframe pattern defined in the following Table 1, Table 2, Table 3 or Table 4 is derived from following calculation: i_s=floor(UE_ID/N) mod Ns. If P-RNTI is monitored on MPDCCH, the PNB is determined by the following equation: PNB=floor(UE_ID/(N*Ns)) mod Nn. For FDD, if P-RNTI is transmitted on PDCCH or NPDCCH, or if P-RNTI is transmitted on MPDCCH with system bandwidth>3 MHz, the subframe pattern of Table 1 is used.

TABLE 1

| Ns | PO when i_s = 0 | PO when i_s = 1 | PO when i_s = 2 | PO when i_s = 3 |
|----|---|---|---|---|
| 1  | 9 | N/A | N/A | N/A |
| 2  | 4 | 9 | N/A | N/A |
| 4  | 0 | 4 | 5 | 9 |

For FDD, if P-RNTI is transmitted on MPDCCH with system bandwidth of 1.4 MHz and 3 MHz, the subframe pattern of Table 2 is used.

TABLE 2

| Ns | PO when i_s = 0 | PO when i_s = 1 | PO when i_s = 2 | PO when i_s = 3 |
|----|---|---|---|---|
| 1  | 5 | N/A | N/A | N/A |
| 2  | 5 | 5 | N/A | N/A |
| 4  | 5 | 5 | 5 | 5 |

For TDD (all UL/DL configurations), if P-RNTI is transmitted on PDCCH, or if P-RNTI is transmitted on MPDCCH with system bandwidth >3 MHz, the subframe pattern of Table 3 is used.

TABLE 3

| Ns | PO when i_s = 0 | PO when i_s = 1 | PO when i_s = 2 | PO when i_s = 3 |
|----|---|---|---|---|
| 1  | 0 | N/A | N/A | N/A |
| 2  | 0 | 5 | N/A | N/A |
| 4  | 0 | 1 | 5 | 6 |

For TDD (all UL/DL configurations), if P-RNTI is transmitted on MPDCCH with system bandwidth of 1.4 MHz and 3 MHz, the subframe pattern of Table 2 is used.

TABLE 4

| Ns | PO when i_s = 0 | PO when i_s = 1 | PO when i_s = 2 | PO when i_s = 3 |
|----|---|---|---|---|
| 1  | 1 | N/A | N/A | N/A |
| 2  | 1 | 6 | N/A | N/A |
| 4  | 1 | 1 | 6 | 6 |

System Information DRX parameters stored in the UE shall be updated locally in the UE whenever the DRX parameter values are changed in system information (SI). If the UE has no international mobile subscriber identity (IMSI), for instance when making an emergency call without USIM, the UE shall use as default identity UE_ID=0 in the PF, i_s, and PNB formulas above. The following Parameters are used for the calculation of the PF, i_s, and PNB.

T: DRX cycle of the UE. Except for NB-IoT, if a UE specific extended DRX value of 512 radio frames is configured by upper layers according to section 7.3 of 3GPP TS 36.304, T=512. Otherwise, T is determined by the shortest of the UE specific DRX value, if allocated by upper layers, and a default DRX value broadcast in system information. If UE specific DRX is not configured by upper layers, the default value is applied. UE specific DRX is not applicable for NB-IoT.

nB: 4T, 2T, T, T/2, T/4, T/8, T/16, T/32, T/64, T/128, and T/256, and for NB-IoT also T/512, and T/1024.

N: min(T,nB).

Ns: max(1, nB/T).

Nn: number of paging narrowbands provided in system information.

UE_ID: IMSI mod 1024, if P-RNTI is monitored on PDCCH; P IMSI mod 4096, if P-RNTI is monitored on NPDCCH; IMSI mod 16384, if P-RNTI is monitored on MPDCCH.

IMSI ≐ IMSI is given as sequence of digits of type Integer (0 . . . 9), IMSI shall in the formulae above be interpreted as a decimal integer number, where the first digit given in the sequence represents the highest order digit. For example: IMSI=12 (digit1=1, digit2=2). In the calculations, this shall be interpreted as the decimal integer "12", not "1×16+2=18".

A UE in IDLE mode may be configured by upper layers with an extended DRX (eDRX) cycle $T_{eDRX}$. The UE may operate in extended DRX only if the cell indicates support for eDRX in System Information. If the UE is configured with a $T_{eDRX}$ cycle of 512 radio frames, it monitors POs with parameter T=512. Otherwise, a UE configured with eDRX monitors POs based on the upper layer configured DRX value and a default DRX value, during a periodic Paging Time Window (PTW) configured for the UE or until a paging message including the UE's NAS identity is received for the UE during the PTW. The PTW is UE-specific and is determined by a Paging Hyperframe (PH), a starting position within the PH (PTW_start) and an ending position (PTW_end). PH, PTW_start and PTW_end are given by the following formulae: H-SFN mod $T_{eDRX,H}$=(UE_ID_H mod $T_{eDRX,H}$), where UE_ID_H is 10 most significant bits of the Hashed ID, if P-PRNTI is monitored on PDCCH or MPDCCH, or 12 most significant bits of the Hashed ID, if P-RNTI is monitored on NPDCCH; IMSI mode 1024; $T_{eDRX,H}$ is eDRX cycle of the UE in hyper-frames ($T_{eDRX,H}$=1, 2, . . . , 256 Hyper-frames) (for NB-IoT, $T_{eDRX,H}$=2, . . . , 1024 hyper-frames) and configured by upper layers. PTW_start denotes the first radio frame of the PH that is part the PTW and has SFN satisfying the following equation: SFN=256*$i_{eDRX}$, where $i_{eDRX}$=floor (UE_ID_H/$T_{eDRX,H}$) mod 4. PTW_end is the last radio frame of the PTW and has SFN satisfying the following equation: SFN=(PTW_start+L*100-1) mod 1024, where L=Paging Time Window length (in seconds) configured by upper layers. Hashed ID is defined as follows: Hashed_ID is the Cyclic Redundancy Check value of $b_{31}, b_{30}$ . . . , $b_0$ of S-TMSI, computed according to CRC-32 algorithm in ITU-T Recommendation V.42 (03/2002) "Error-correcting procedures for DCEs using asynchronous-to-synchronous conversion", and S-TMSI=<b39, b38, . . . b0> as defined in 3GPP TS 23.003.

Figure 7:
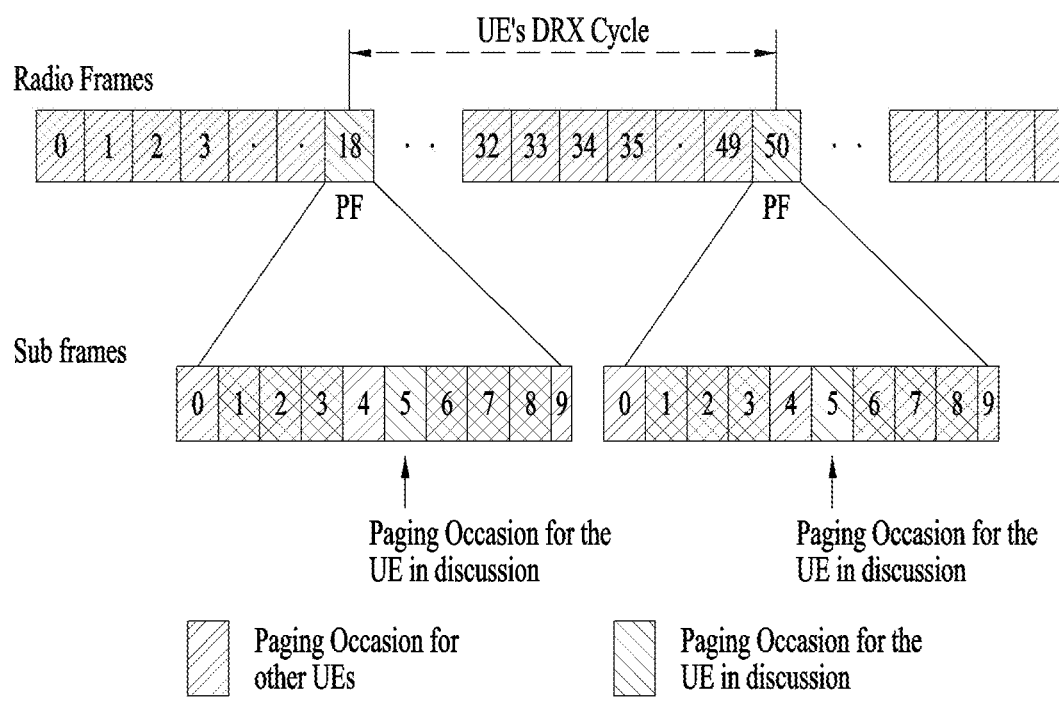
FIG. 7 illustrates POs used in an LTE system.

FIG. 7 illustrates POs used in an LTE system. Particularly, FIG. 7 illustrates POs when a DRX cycle (i.e., a paging DRX cycle) of a UE is 32 (i.e., T=32), a paging cycle, i.e., the number of POs in the DRX cycle for all users in a cell, is 4T (i.e., Bn=4T), and UE_ID is 722. In FIG. 7, all radio frames are PFs. 4 subframes (Ns=4) per PF are used for paging in the paging DRX cycle. Among subframes 0, 4, 5, and 9 used for paging in a PF according to a subframe pattern which is predefined for Ns=4 in FDD, a PO for the UE is subframe 5. 32 PFs and 128 POs (nB=128) are available in the DRX cycle of the UE. UEs are distributed across the DRX cycle based on UE identities (IDs).

Figure 8:
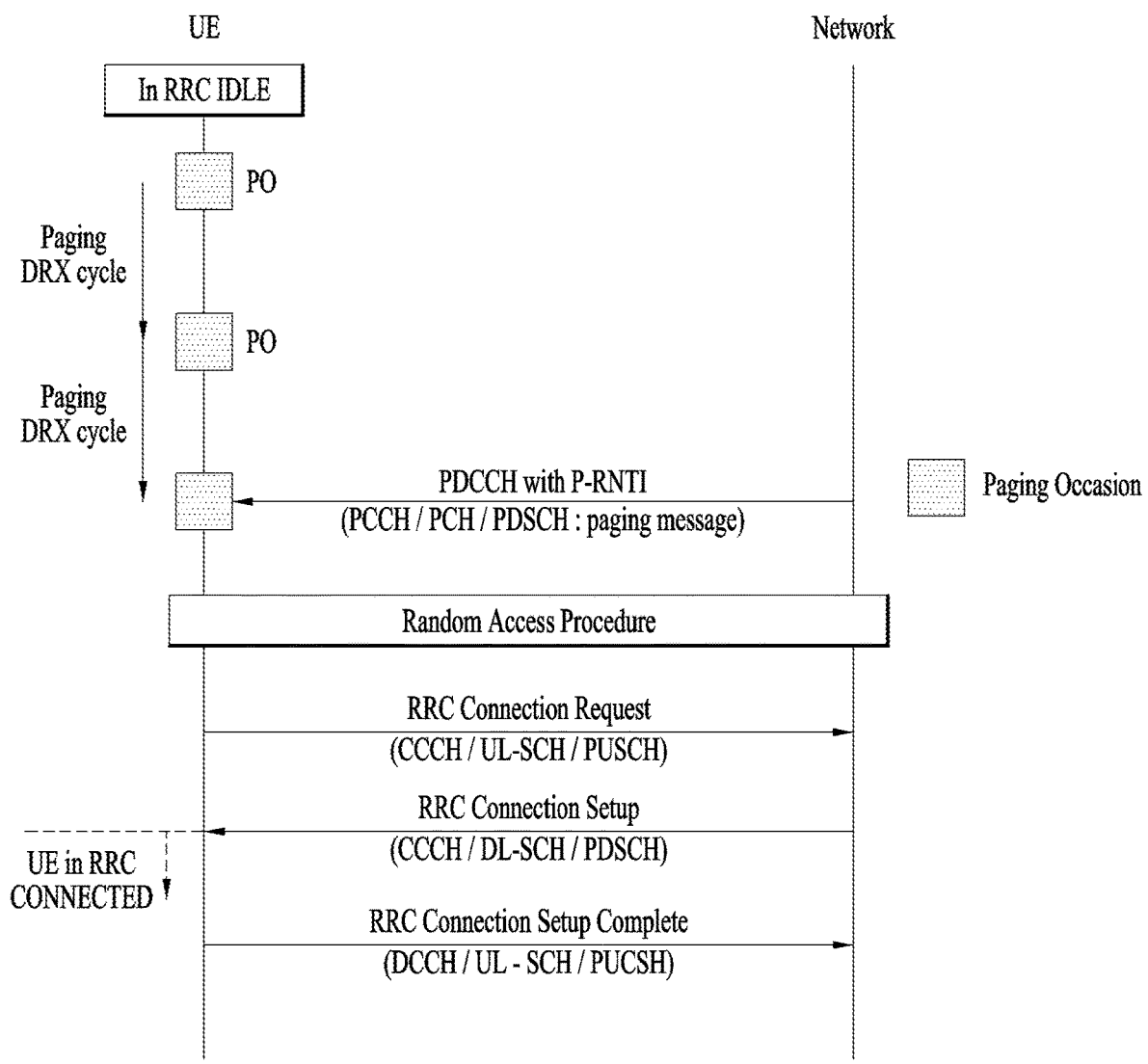
FIG. 8 is a flowchart illustrating an LTE paging procedure.

FIG. 8 is a flowchart illustrating an LTE paging procedure. The purpose of the paging procedure is to transmit paging information to a UE in RRC_IDLE and/or; to inform UEs in RRC_IDLE and UEs other than NB-IoT UEs in RRC_CONNECTED of system information change and/or; to inform UEs other than NB-IoT UEs of an ETWS primary notification and/or an ETWS secondary notification and/or; to inform UEs other than NB-IoT UEs of a CMAS notification and/or; to inform UEs other than NB-IoT UEs in RRC_IDLE of an EAB parameter modification and/or; to inform UEs other than NB-IoT UEs in RRC_IDLE that an E-UTRAN inter-frequency redistribution procedure should be performed. The paging information is provided to higher layers, which, in response, may initiate RRC connection establishment, for example, to receive an incoming call.

A mobility management entity (MME) is responsible for initiation of the LTE paging procedure. The MME initiates the LTE paging procedure by forwarding an S1 application protocol (S1AP) paging message to one or more eNBs. The LTE paging procedure is applicable to a UE of an ECM IDLE state. The UE in ECM_IDLE is in an RRC_IDLE mode and does not have S1 connectivity with the MME. The location of the UE in ECM_IDLE is known to the MME on a TA basis. The MME should forward the S1AP paging message to all eNB(s) in a related TA. Since the UE(s) may be registered in one or more TAs, the MME forwards the paging message to a plurality of eNBs. The MME starts a timer T3413 after transmitting the S1AP paging message for a PS data call. The eNB receives the S1AP paging message from the MME and constructs an RRC paging message. A single RRC message may carry information from multiple S1APs. The paging message may include a plurality of paging records to page a plurality of UEs. The UE in RRC_IDLE checks paging once every DRX cycle. A PO in a PF defines a specific subframe in which an LTE UE checks the paging message. The UE searches for a P-RNTI within a PDCCH of a subframe belonging to the PO. The P-RNTI indicates that the UE may have the paging message on a PDSCH. If the UE finds the P-RNTI in the PDCCH, the UE decodes resource allocation information carried by the PDCCH. The UE decodes the RRC message from the PDSCH and checks a UE ID in all of the paging record(s). If the UE does not discover a UE ID thereof in the paging record(s), the UE returns to check a PDCCH for the P-RNTI in each PO. If the UE discovers the UE ID thereof, the UE triggers a random access procedure to establish RRC connection. The UE transmits an RRC connection request message and the eNB responds with an RRC connection setup message. If the LTE paging procedure is a procedure for a PS data call, the UE includes a service request non-access stratum (NAS) message within an RRC connection setup complete message. If the paging procedure is for a terminating circuit switched (CS) fallback call, the UE includes an extended service request NAS message within the RRC connection setup complete message. The eNB forwards the NAS message to the MME. If T3413 is running, the eNB stops T3413 and proceeds to establish connection with the UE. If T3413 expires before the MME receives the NAS message from the UE, paging retransmission is triggered.

In the field of communication standard technology, conventional discussion regarding UE-to-network relaying has continued such that, if a communication standard remote UE transmits/receives a signal through a UE-to-network relay UE, a network node (e.g., eNB) recognizes only the UE-to-network relay UE as a normal UE and it does not matter if the network node is not aware of whether or not the UE-to-network relay UE is performing relaying. In this way, relaying in which the network node is not aware of the presence of a UE linked to a UE with which the network node directly establishes RRC connection is referred to as layer-3 relaying or L3 relaying. A UE-to-network relay UE supporting L3 relaying is particularly referred to as an L3 UE-to-network relay UE. As a remarkable increase in wearable, MTC, and IoT devices is expected, the network needs to control remote UEs that access the network via the UE-to-network relay UE. Accordingly, layer-2 (L2) relaying, which is relaying performed in a situation in which the network is aware of the presence of a remote UE communicating with the network via the relay UE, is under discussion in the field of wireless communication. The present invention considers that the relay UE and the remote UE are connected to the network through L2 relaying. A relay UE supporting L2 relaying is referred to as an L2 relay UE.

Hereinafter, "linked" represents that a link of a short range is set up between a remote UE and a relay UE and the two UEs may exchange data in any direction. In PC5, a "linked" state is equivalent to a PC5 connection established state. The relay UE does not need to be in RRC_CONNECTED. However, the relay UE is within coverage of the network and may communicate with the network on a Uu interface. While the remote UE is linked with the relay UE, the remote UE is not required to be in RRC_CONNECTED. The relay UE may be in RRC_IDLE while the relay UE is linked with the remote UE. An RRC connection state of the remote UE and the relay UE may be changed independently of PC5/non-3GPP connection states of the remote UE and the relay UE. While unicast data is relayed, both the relay UE and the remote UE are in RRC_CONNECTED. For description, if the remote UE is used, RRC_CONNECTED represents that the remote UE has a context in the eNB. The relay UE may provide unicast and broadcast services.

Figure 9:
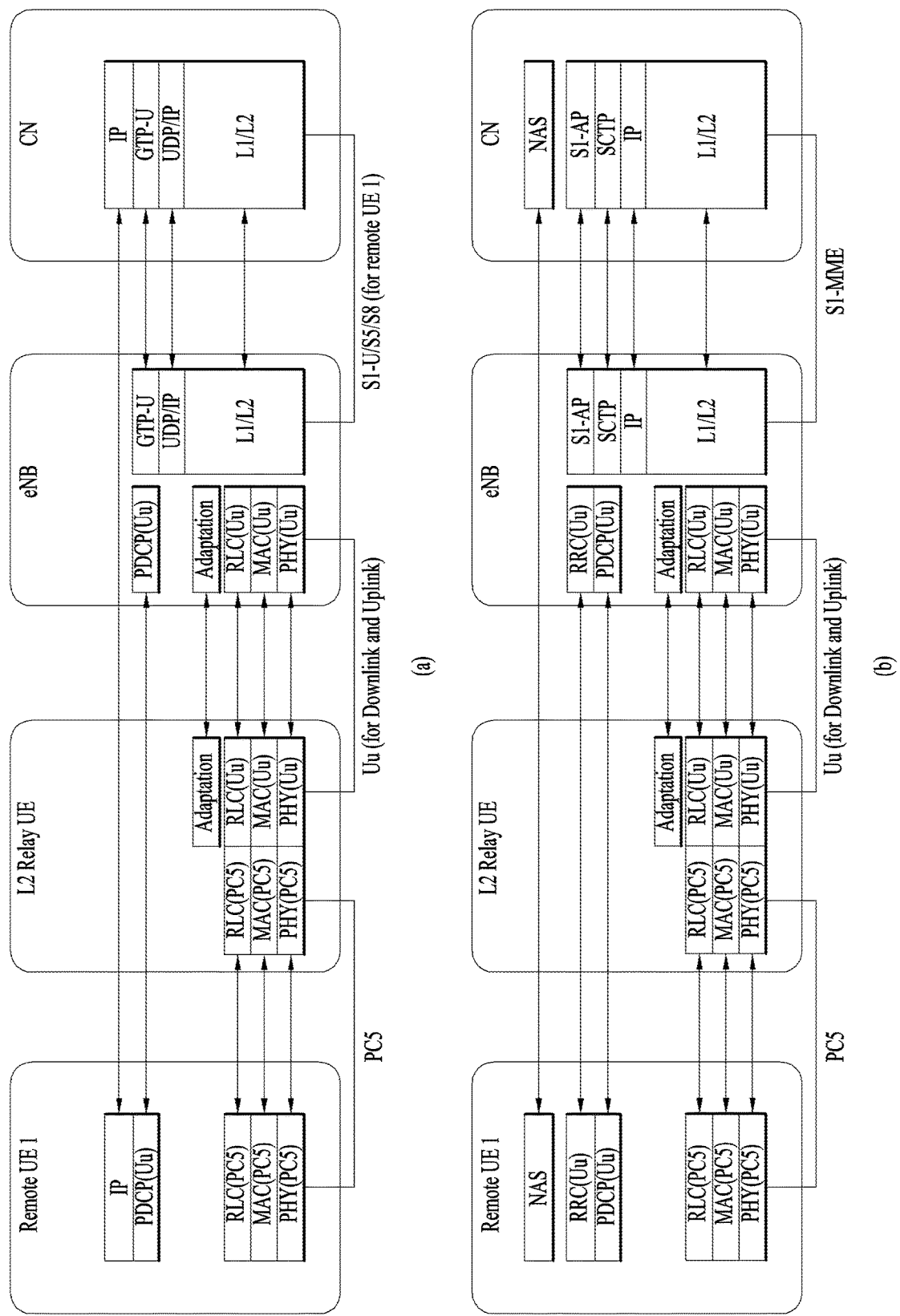
FIG. 9 illustrates wireless protocol stacks for layer-2 relaying.

FIG. 9 illustrates wireless protocol stacks for L2 relaying. Particularly, FIG. 9 illustrates wireless protocol stacks for L2 relaying via PC5.

In protocol architecture for a user plane and a control plane, relaying is performed above an RLC sublayer. User plane data and control plane data of the remote UE are relayed via the relay UE from the remote UE to the network or vice versa, over the RLC sublayer. A Uu PDCP and an RRC are terminated between the remote UE and the eNB. RLC, MAC, PHY, and non-3GPP transport layers are terminated in respective links (i.e., links between the remote UE and the relay UE and links between the relay UE and the eNB). FIG. 9(a) and FIG. 9(b) illustrate a user plane protocol stack and a control plane protocol stack, respectively, when PC5 is used between the remote UE and the L2 relay UE.

If the relay UE and the remote UE are connected to the network via L2 relaying, the network should relay a paging message to the remote UE via the relay UE in order to page the remote UE. There are two methods of relaying the paging message to the remote UE via the relay UE (when one relay UE is connected to one remote UE). That is, 1) a method in which the network transmits the paging message of the relay UE or the remote UE in a PO of the relay UE so that the relay UE wakes up once to check whether the paging message for the relay UE or the remote UE is received and 2) a method in which the relay UE wakes up in POs of the relay UE and the remote UE to monitor paging messages of the relay UE and the remote UE may be considered. If the relay UE should receive the paging message in the PO of the remote UE in order to receive paging for the remote UE linked thereto, the relay UE should monitor a P-RNTI PDCCH in the PO thereof and the PO of the remote UE, thereby increasing power consumption of the relay UE. If the number of remote UEs connected to the relay UE increases, power consumption of the relay UE greatly increases. As mentioned above, in a ProSe network-to-relay operation, it is expected that wearable, MTC, and IoT devices will be mainly used as remote UEs. In this case, since these devices are low-cost UEs and, therefore, are provided with low battery capacity, there is a high probability that the devices are under a circumstance in which battery consumption should be minimized. Therefore, a paging method of devices participating in ProSe network-to-relay communication is desired to achieve an energy-efficient operation of the devices.

From this point of view, the present invention proposes a method in which the relay UE and the remote UE receive respective paging messages with low power consumption while minimizing an influence on the network.

The present invention proposes aligning the PO of the relay UE and the PO of the remote UE (within a predetermined time) or allocating a separate PO to the remote UE so that the relay UE may efficiently relay a paging message of the remote UE to the remote UE. According to the present invention, power consumption may be reduced when the relay UE relays the paging message to remote UE(s).

<Paging Relaying Operation>

In the present invention, it is assumed that the relay UE is connected to the remote UE through a PC5 interface and the remote UE is linked to the relay UE through L2 relaying. If the remote UE is linked through L2 relaying, the network is aware of a context of the remote UE. The network may be aware of which remote UE is connected to which remote UE through the context of the remote UE.

Although the relay UE may additionally wake up in the PO of the remote UE to check the paging message, this method causes additional energy consumption in order for the relay UE to relay the paging message of the remote UE.

The relay UE is aware of the PO thereof and should be aware of UE_ID (e.g., IMSI) of the remote UE for the PO of the remote UE. Alternatively, the remote UE may forward the PO value thereof, instead of UE_ID thereof, to the relay UE. Information about the PO of the remote UE may be transmitted/received through PC5 connection.

The relay UE checks whether there is a paging message transmitted thereto or transmitted to the remote UE in the PO thereof.

If the relay UE receives the paging message therefor, the relay UE establishes RRC connection with the network through a random access procedure.

If the relay UE receives the paging message for the remote UE, the relay UE relays the paging message to the remote UE.

<Method 1. PO Alignment with Relay UE>

If the relay UE receives the paging message for the remote UE in the PO thereof, the relay UE transmits the paging message to the remote UE.

The present invention considers aligning in time the PO of the relay UE and the PO of the remote UE. Then, the relay UE may wake up in the PO thereof and receive not only the paging message therefor but also the paging message of the remote UE (in the PO thereof or another PO near the PO thereof in time).

Figure 10:
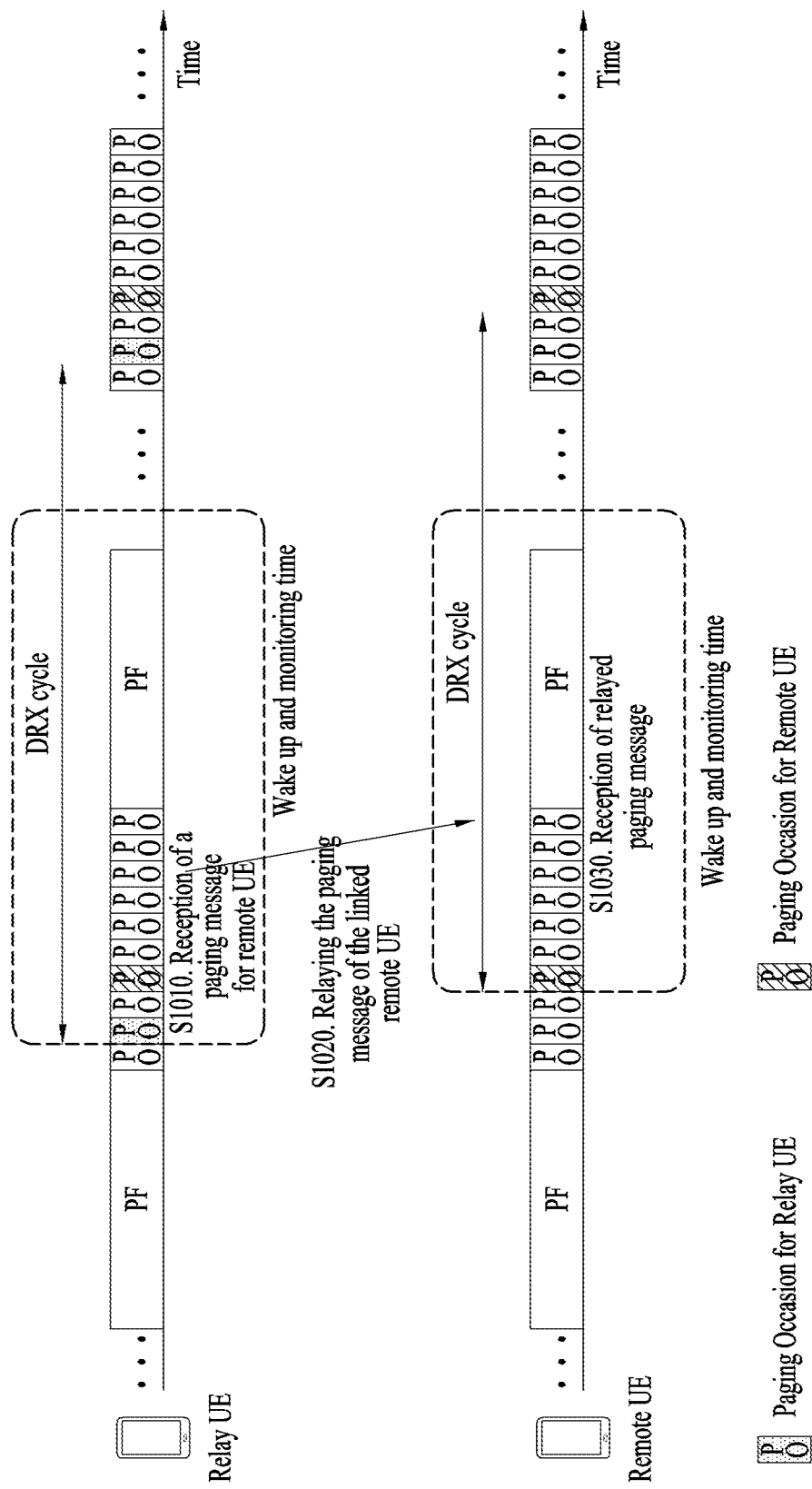
FIG. 10 illustrates POs used to relay a paging message for a remote user equipment (UE) according to the present invention.

FIG. 10 illustrates POs used to relay a paging message for a remote UE according to the present invention.

A UE in RRC_IDLE wakes up in a PO thereof (or prior to the PO thereof) to monitor a P-RNTI PDCCH. The UE wakes up in the PO to confirm a paging message and maintains a wakeup state for a predetermined time (e.g., for a few tens of msec) without immediately sleeping. For example, since the network transmits the paging message several times, even if the UE fails to receive the paging message at a time, the UE may attempt to receive the paging message that the network may transmit while the UE wakes up for a predetermined time. According to the present invention, the relay UE may monitor a PO of the remote UE which is present while the relay UE wakes up to monitor paging in the PO thereof. If the paging message for the remote UE is present, since the relay UE may immediately transmit the paging message to the remote UE (e.g., when the relay UE receives the paging message or within a paging frame in which the paging message is received), a procedure in which the relay UE separately wakes up in the PO of the remote UE and then sleeps may be omitted so that power consumption of the relay UE may be reduced. Even if the UE in RRC_IDLE may accurately wake up only in the PO thereof and then may immediately sleep, the present invention may be applied to the UE by causing the UE to wake up for a predetermined time including the PO of the UE. Then, a procedure in which the relay UE separately wakes up in the PO of the remote UE linked thereto and then sleeps may be omitted so that power consumption of the relay UE may be reduced. To align the PO of the relay UE and the PO of the remote UE, Option 1 and Option 2 are proposed. A detailed procedure according to Method 1 may be as follows.

>The remote UE establishes L2 connection (e.g., RRC connection) with the eNB via the relay UE.

>The remote UE and the relay UE establish PC5 connection therebetween through a PC5 interface.

>>Option 1: The relay UE calculates a PF thereof and a PO thereof based on UE_ID thereof. The relay UE transmits the calculated PF value and PO value to the network in order to obtain POs of remote UE(s) linked thereto. That is, the relay UE informs the network of the PF and PO thereof. The network calculates PO(s) which are behind in time, except for the PO used by the relay UE, within the PF used by the relay UE. The network informs the relay UE of one or plural PO(s) among PO(s) which are behind in time the PO of the relay UE among POs within the PF of the relay UE. The one or plural PO(s) signaled by the network may be shared between all remote UE(s) linked to the relay UE. The relay UE informs the remote UEs of the PF thereof through PC5 connection. The relay UE informs the remote UEs of the one or plural POs received from the network through PC5 connection.

>>Option 2: The relay UE calculates a PF thereof and a PO thereof based on UE ID thereof. The relay UE transmits the calculated PF value and PO value to the network in order to obtain POs of remote UE(s) linked thereto. That is, the relay UE informs the network of the PF and PO thereof. The network additionally generates one or plural POs different from the PO used by the relay UE within the PF used by the relay UE. Unlike Option 1 in which the PO of the remote UE is located after the PO of the relay UE in time, Option 2 may allocate any PO within the PF of the relay UE as the POs of the remote UEs. The network informs the relay UE of the generated one or plural PO(s). The one or plural PO(s) signaled by the network may be shared between all remote UE(s) linked to the relay UE. The relay UE transmits the PF value thereof to the remote UEs through PC5 connection. The relay UE informs the remote UEs of the one or plural PO(s) received from the network through PC5 connection.

>The relay UE checks whether there is a paging message transmitted in the PO thereof.

>The remote UE checks whether there is a paging message relayed thereto by the relay UE in a PO aligned with the PO of the relay UE (within the same PF) (S1010).

>The relay UE may receive the following paging message in the PO thereof.

1) Paging message for the remote UE: If the relay UE receives a paging message for the remote UE in the PO thereof, the relay UE immediately transmits the paging message to the remote UE linked thereto in the PO. Since the remote UE has woken up in a PO thereof aligned with the PO of the relay UE, the remote UE may immediately receive the paging message transmitted by the relay UE.

2) Paging message for the relay UE: If there is a paging message transmitted to the relay UE, the relay UE performs a random access procedure to establish RRC connection with the network (e.g., eNB).

3) Paging messages for the relay UE and the remote UE: If the relay UE and the remote UE simultaneously receive paging messages, the relay UE performs a random access procedure to establish RRC connection with the network (e.g., eNB). At the same time, the relay UE relays the paging message for the remote UE to the remote UE in the PO of the relay UE.

>Since the remote UE has woken up in the PO thereof aligned with the PO of the relay UE, if the relay UE immediately relays the paging message of the remote UE received (S1010) in the PO thereof or the PO of the remote UE (S1020), the remote UE may receive the paging message (S1030).

According to the present invention, the relay UE may wake up only in the PO thereof and may immediately relay the paging message. Therefore, the relay UE does not need to additionally wake up in order to relay the paging message of the remote UE to the remote UE.

<Method 2. Dedicated PO>

As opposed to Method 1, in Method 2, a separate PO, rather than a PO within the same PF as a PF of the relay UE, is allocated to the remote UE and the relay UE relays a paging message for the remote UE to the remote UE in the separate PO. A detailed procedure according to Method 2 may be as follows.

>The remote UE establishes L2 connection (RRC connection) with the eNB via the relay UE.

>The remote UE and the relay UE establish PC5 connection therebetween through a PC5 interface.

>The relay UE calculates a PF and a PO based on UE_ID thereof. The relay UE requests that the network that POs (and a PF) be transmitted in order to obtain POs of remote UE(s) linked thereto. The network generates or calculates one or plural dedicated POs different from the PO of the relay UE. The one or plural dedicated POs may be configured per linked UE group in consideration of services provided by linked UEs (e.g., MTC or IoT devices). The network informs the relay UE of the calculated one or plural PO(s). The one or plural dedicated PO(s) signaled by the network may be shared between all remote UE(s) linked to the relay UE. The relay UE informs the remote UEs linked thereto of the PF value thereof through PC5 connection. The relay UE informs the remote UEs of the dedicated PO(s) received from the network through PC5 connection.

>The relay UE checks whether there is a paging message transmitted in the PO thereof.

>The remote UE checks whether there is a paging message relayed thereto in the dedicated PO.

>The relay UE may receive the following paging message in the PO thereof.

1) Paging message for the remote UE: Upon receiving a paging message for the remote UE in the PO, the relay UE transmits the paging message in the dedicated PO to the remote UE linked thereto. Since the remote UE has woken up in the dedicated PO, the remote UE may receive the paging message transmitted in the dedicated PO by the relay UE.

2) Paging message for the relay UE: If there is a paging message transmitted to the relay UE, the relay UE performs a random access procedure to establish RRC connection with the network (e.g., eNB).

3) Paging messages for the relay UE and the remote UE: If the relay UE and the remote UE simultaneously receive the paging messages, the relay UE performs a random access procedure to establish RRC connection with the network (e.g., eNB). At the same time, the relay UE relays the paging message for the remote UE to the remote UE in the dedicated PO.

>Since the remote UE is capable of receiving the paging message in the dedicated PO, the remote UE may receive the paging message transmitted by the relay UE.

In Method 2, since the relay UE has already been aware of POs of the remote UEs even if the relay UE receives paging messages of the remote UEs, the relay UE relays the paging messages in consideration of the POs of the remote UEs. According to Method 2, since the relay UE only needs to wake up in determined POs to relay the paging messages, power consumption of the relay UE may be reduced.

Figure 11:
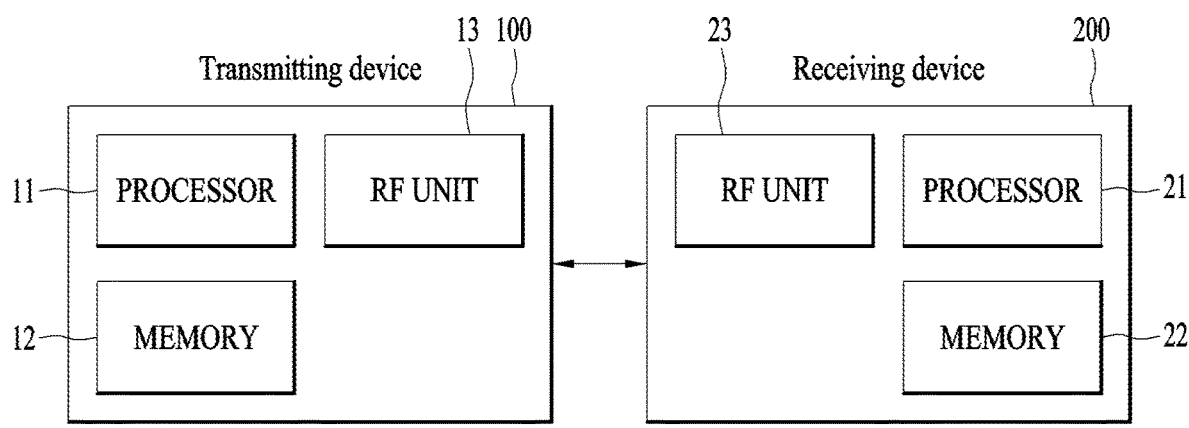
FIG. 11 is a block diagram illustrating elements of a transmitting device 100 and a receiving device 200 for implementing the present invention.

FIG. 11 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

In the present invention, a processor of a relay UE may control an RF unit of the relay UE to receive a paging message of a remote UE linked to the relay UE and transmit the paging message to the remote UE. The processor of the relay UE controls the RF unit of the relay UE to transmit PF information and PO information to the remote UE. The processor of the relay UE may control the RF unit of the relay UE to receive the paging message for the remote UE in a PO of the relay UE or a PO of the remote UE within a PF of the relay UE based on the PF information and the PO information. Upon receiving the paging message for the remote UE, the processor of the relay UE may control the RF unit of the relay UE to relay the paging message to the remote UE. The processor of the remote UE may control the RF unit of the remote UE to attempt to receive the paging message for the remote UE based on the PF information and the PO information. The PF information may be information indicating the PF of the relay UE. The processor of the relay UE may control the RF unit of the relay UE to relay the paging message to the remote UE within the PF of the relay UE. The processor of the relay UE may control the RF unit of the relay UE to relay the paging message to the remote UE in a PO in which the paging message is received.

The processor of the relay UE may control the RF unit of the relay UE to transmit, to a network, information indicating the PF of the relay UE and the PO of the relay UE calculated based on a UE ID of the relay UE. A processor of the network (e.g., BS) may be configured to allocate or configure one or plural PO(s) for remote UE(s) linked to the relay UE, based on the information. The processor of the network may control an RF unit of the network to transmit configuration information about the one or plural PO(s) to the relay UE. The processor of the relay UE may control the RF unit of the relay UE to receive the configuration information about one or plural PO(s) from the network. The one or plural PO(s) may be PO(s) belonging to a PF of the relay UE.

The relay UE may be an RRC_IDLE state and have PC5 connection with the remote UE. The processor of the relay UE may relay the paging message to the remote UE through the PC5 connection. The processor of the remote UE may receive the paging message from the relay UE through the PC5 connection.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method of relaying paging by a relay user equipment (UE) linked to a remote UE in a wireless communication system, the method comprising:
transmitting, to a network, information indicating (i) a paging frame (PF) of the relay UE and (ii) a paging occasion (PO) of the relay UE, calculated based on a UE identity of the relay UE;
receiving, from the network, configuration information indicating one or more POs;
transmitting, to the remote UE, PF information and PO information;
receiving a paging message for the remote UE in a PO of the relay UE or a PO of the remote UE within a PF of the relay UE based on the PF information and the PO information; and
relaying the paging message to the remote UE,
wherein the PF information includes information indicating the PF of the relay UE,
wherein the PO information includes information indicating the one or more POs, and
wherein the one or more POs belong to the PF of the relay UE.

2. The method of claim 1,
wherein the paging message is relayed to the remote UE within the PF of the relay UE.

3. The method of claim 1,
wherein the paging message is relayed to the remote UE in a PO in which the paging message is received.

4. The method of claim 1,
wherein the relay UE is in an RRC_IDLE state and has PC5 connection with the remote UE, and
the paging message is relayed to the remote UE by the relay UE through the PC5 connection.

5. A relay user equipment (UE) configured to be linked to a remote UE and to relay paging in a wireless communication system, the relay UE comprising,
a radio frequency (RF) unit, and
a processor configured to control the RF unit,
wherein the processor is configured to:
control the RF unit to transmit, to a network, information indicating (i) a paging frame (PF) of the relay UE and (ii) a paging occasion (PO) of the relay UE, calculated based on a UE identity of the relay UE;
control the RF unit to receive, from the network, configuration information indicating one or more POs;
control the RF unit to transmit, to the remote UE, PF information and PO information;
control the RF unit to receive a paging message for the remote UE in a PO of the relay UE or a PO of the remote UE within a PF of the relay UE based on the PF information and the PO information; and
control the RF unit to relay the paging message to the remote UE,
wherein the PF information includes information indicating the PF of the relay UE,
wherein the PO information includes information indicating the one or more POs, and
wherein the one or more POs belong to the PF of the relay UE.

6. The relay UE of claim 5,
wherein the processor controls the RF unit to relay the paging message to the remote UE within the PF of the relay UE.

7. The relay UE of claim 5,
wherein the processor controls the RF unit to relay the paging message to the remote UE in a PO in which the paging message is received.

8. The relay UE of claim 5,
wherein the relay UE is in an RRC_IDLE state and has PC5 connection with the remote UE, and
the processor controls the RF unit to relay the paging message to the remote UE through the PC5 connection.

9. A processing device configured to control a relay user equipment (UE), which is linked to a remote UE, to relay paging in a wireless communication system, the processing device comprising:
a processor; and
a computer memory operably connected to the processor and storing instructions that, based on being executed by the processor, perform operations comprising:
transmitting, to a network, information indicating (i) a paging frame (PF) of the relay UE and (ii) a paging occasion (PO) of the relay UE, calculated based on a UE identity of the relay UE;
receiving, from the network, configuration information indicating one or more POs;
transmitting, to the remote UE, PF information and PO information;
receiving a paging message for the remote UE in a PO of the relay UE or a PO of the remote UE within a PF of the relay UE based on the PF information and the PO information; and relaying the paging message to the remote UE,
wherein the PF information includes information indicating the PF of the relay UE,
wherein the PO information includes information indicating the one or more POs, and
wherein the one or more POs belong to the PF of the relay UE.

10. The processing device of claim 9,
wherein the paging message is relayed to the remote UE within the PF of the relay UE.

11. The processing device of claim 9,
wherein the paging message is relayed to the remote UE in a PO in which the paging message is received.

12. The processing device of claim 9,
wherein the relay UE is in an RRC_IDLE state and has PC5 connection with the remote UE, and
the paging message is relayed to the remote UE by the relay UE through the PC5 connection.

\* \* \* \* \*